United States Patent [19]
Soenen et al.

[11] Patent Number: 5,874,909
[45] Date of Patent: Feb. 23, 1999

[54] ANALOG TO DIGITAL VIDEO CONVERTER

[75] Inventors: Eric Soenen, Plano; James E. Nave, Denton; Kirk D. Peterson, Plano, all of Tex.; Andrew J. Cringean; James R. C. Craig, both of Edinburgh, United Kingdom

[73] Assignee: Texas Instruments Incorporated, Dallas, Tex.

[21] Appl. No.: 799,904

[22] Filed: Feb. 13, 1997

Related U.S. Application Data

[60] Provisional application No. 60/012,309 Feb. 13, 1996.

[51] Int. Cl.$^6$ ................................................ H03M 1/12
[52] U.S. Cl. .......................................... 341/141; 341/155
[58] Field of Search ..................................... 341/141, 155

[56] References Cited

U.S. PATENT DOCUMENTS

| | | | |
|---|---|---|---|
| 4,632,558 | 12/1986 | Maassen et al. | 356/404 |
| 4,660,098 | 4/1987 | Wolcott | 358/332 |
| 4,672,450 | 6/1987 | Collins | 358/153 |
| 4,698,678 | 10/1987 | Collins | 358/148 |
| 4,982,272 | 1/1991 | Brody | 358/59 |
| 5,245,399 | 9/1993 | Wertz et al. | 356/71 |
| 5,546,478 | 8/1996 | Yoo et al. | 382/282 |
| 5,633,686 | 5/1997 | Boden | 348/441 |
| 5,680,133 | 10/1997 | Komatsu | 341/155 |

*Primary Examiner*—Marc S. Hoff
*Attorney, Agent, or Firm*—Robby T. Holland; Carl H. Hoel; Richard L. Donaldson

[57] ABSTRACT

An integrated analog to digital interface subsystem for imaging applications includes digital global and digital pixel by pixel offset correction and scaling. The integrated interface 2 includes 3 DAC's 2c1–2c3 that are used to do a rough offset cancellation on the three analog input signals (RGB) in the analog domain. A triple sample/hold circuit 2a samples the RGB signals simultaneously, multiplexes the data and passes the three signals on the ADC 2b sequentially (at about 3 times the data rate). The sample/hold circuit 2a has the capability to operate in fully differential as well as single ended input mode, and can perform correlated double sampling if needed. A high resolution ADC 2b converts the 3 multiplexed signals from simple/hold circuit 2a. A first digital offset correction circuit 2f restores the level of the RGB signals in the digital domain on a pixel by pixel basis. A first digital gain correction circuit 2g compensates for sensitivity variations of the RGB sensors in the digital domain on a pixel by pixel basis. A second digital offset correction circuit 2h restores the overall DC level of the RGB signals in the digital domain. A second digital gain correction circuit 2i compensates for overall sensitivity variations of the RGB sensors in the digital domain. A serial interface 2d is used to load the overall gain and offset coefficients.

5 Claims, 9 Drawing Sheets

ANALOG TO DIGITAL VIDEO CONVERTER

This is a Non Provisional application filed under 35 USC 119(e) and claims priority of prior provisional, Ser. No. 60/012,309 of inventor Soenen et al., filed Feb. 13, 1996.

FIELD OF INVENTION

This invention is generally in the field of electronic integrated circuits and relates more particularly to image sensing.

BACKGROUND OF INVENTION

In many consumer imaging applications like flat-bed and hand-held scanners, an image coming from one or more charge coupled device (CCD) sensors must be processed in order to compensate for the nonuniform illumination of the subject. In a typical application, three COD sensors are used (one for each of the primary colors red, green and blue (RGB)) to scan the subject on a line-by-line basis. Typically, the sensitivity of each of these sensors is different. Also, the sensitivity of each pixel within one of the line sensors may be different. Finally, because of constraints in mechanical construction and optics of the scanner bed itself, the illumination of the subject is not constant across a line.

To obtain a correct two-dimensional picture out of the CCD signals, two kinds of correction must be performed: global gain and offset correction to account for the difference in sensitivity between red, green and blue sensors, and pixel-by pixel correction to account for the difference in illumination (or sensitivity) within one line.

Prior attempts have utilized scaling or offset correction on individual pixels in the analog domain. This has proved ineffective primarily due to a lack of sensitive analog processing. Better methods are needed to improve resolution.

It is accordingly an object of this invention to provide an apparatus and method for improving resolution in CCD scanning.

Other objects and benefits of the invention will be apparent to those of ordinary skill in the art having the benefit of the description and drawings following herein.

SUMMARY OF INVENTION

An integrated analog to digital interface for imaging applications provides improved resolution by processing in the digital domain as opposed to the analog domain. DAC's provide rough offset cancellation on the three analog input signals (RGB) in the analog domain. A video sample and multiplexing circuit samples the RGB signals simultaneously, multiplexes the data and passes the three signals on an ADC with an effective conversion rate equal to about 3 times the sample rate, which generates a digital representation (pixels) of the 3 analog input signals. A timing and control circuit generates appropriate timing signals. Processing of the output of the ADC occurs through other circuits in the digital domain through coefficients loaded into registers by a serial interface.

BRIEF DESCRIPTION OF APPENDICES

Figure 1:
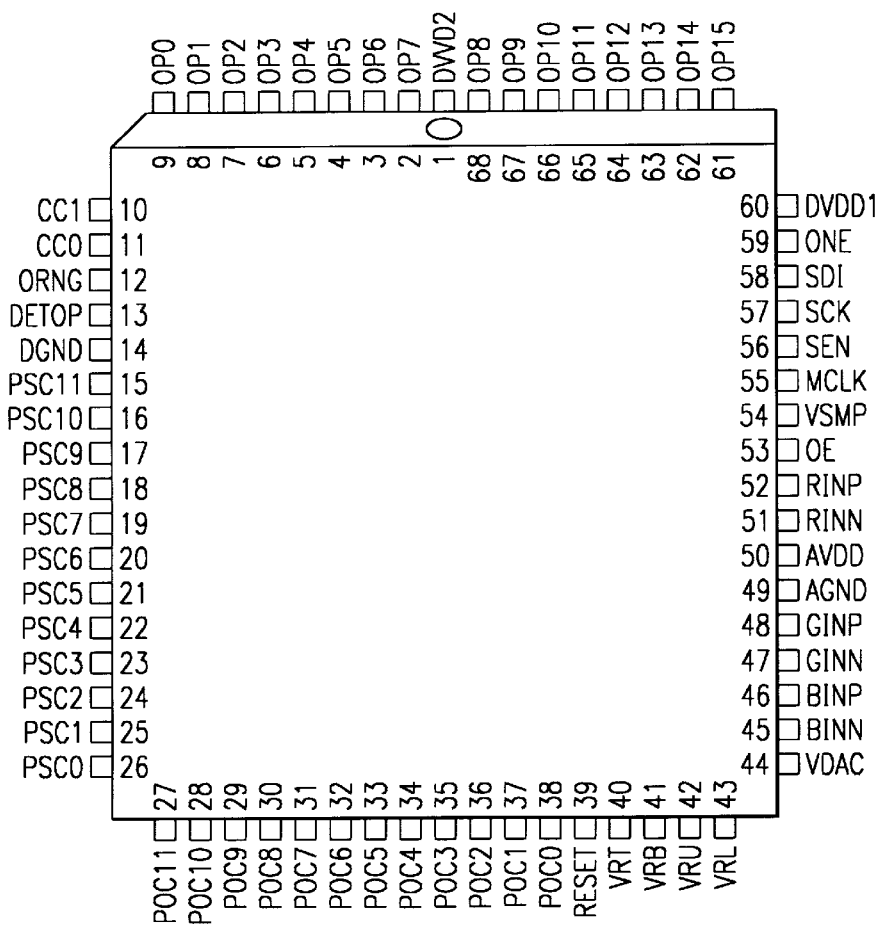
FIG. 1 is a drawing representing the package outline of the inventive analog to digital interface.

Appendix 1 is a table listing of signal names, pin no., type and description of pins corresponding to package FIG. 1.

Appendix 2 table 1 shows input voltage ranges for single ended mode while table 2 shows input voltage ranges for differential mode.

Appendix 3 is a table showing the serial interface register map.

Appendix 4 is a table showing the control bit descriptions corresponding for appendix 3.

DESCRIPTION OF PREFERRED EMBODIMENT

As the following description will reveal, an integrated analog to digital interface is provided which advantageously improves resolution in CCD optical character recognition (OCR) systems by processing in the digital domain as opposed to processing in the analog domain. An input multiplexer allows color operation with a single on-chip analog to digital converter (ADC). Digital signal processing (DSP) circuits correct for non-ideal CCD image sensor and scanning system characteristics. Cost effective grey scale operation is obtained using a single multiplexer input. A three channel input multiplexer and sampling function provides both normal sampling and correlated double sampling. The internal sample and hold allows all three channels to be sampled simultaneously in color operation. Three DACs allow bipolar adjustment of the direct current (DC) level of the signal at the ADC input. Digital "dc" restoration is provided following the ADC. Variations in offset and luminance across a scan may be dynamically corrected on a pixel by pixel basis using calibration data provided by an external data store. Global adjustment of gain, contrast and color balance, and offset for brightness is provided. The output word-length can be programmed to various lengths such as 8, 10, 12 or 16 and a programmable threshold detector is provided or use during calibration and in OCR applications.

FIG. 1 is a package outline of the inventive integrated analog to digital interface 2. Signal names are provided for the various pins of the integrated circuit. Appendix 1 provides a listing of Pin No., Name, Type and Description.

Figure 2A:
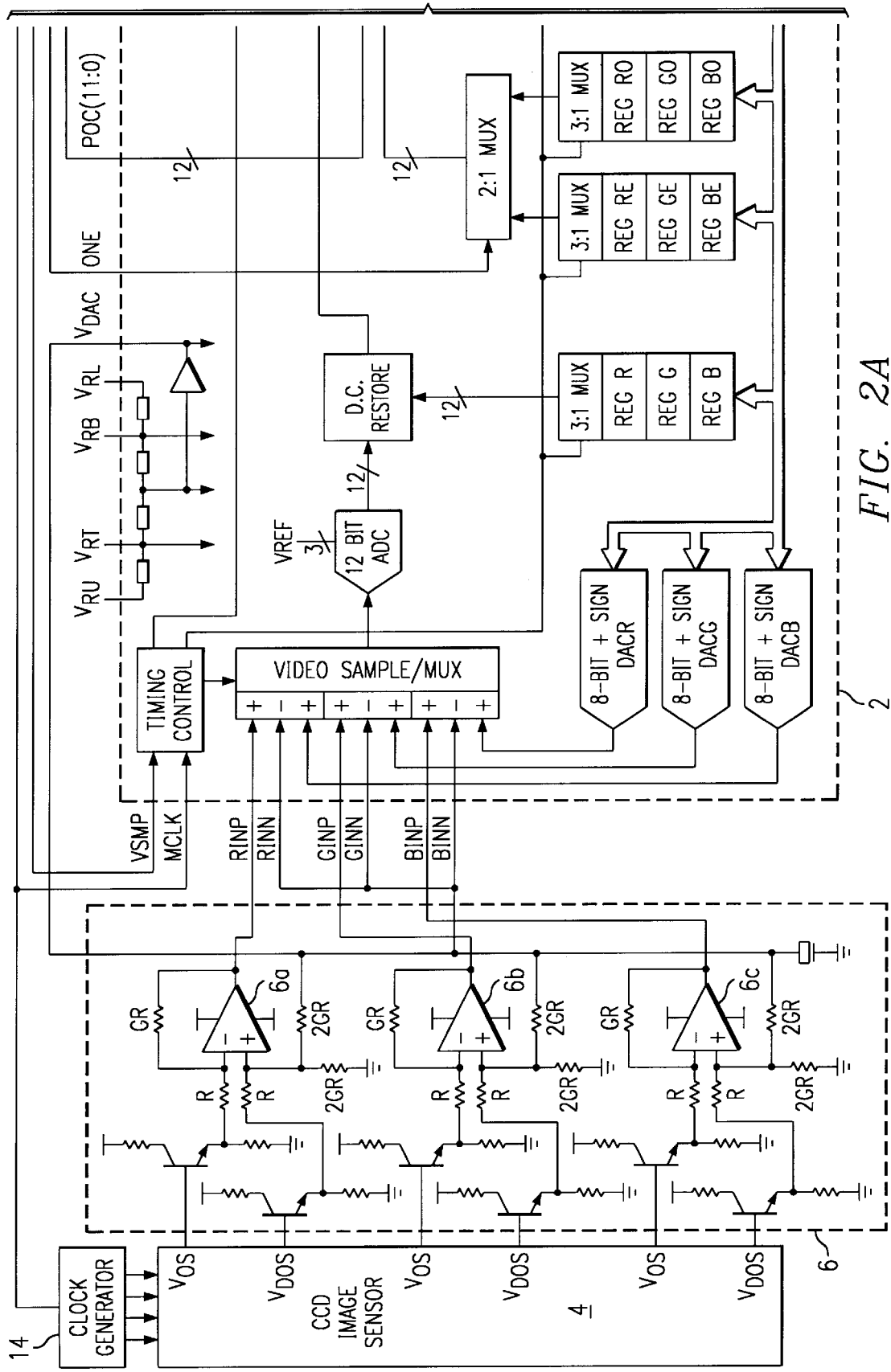
FIG. 2 is a system drawing illustrating the integrated analog to digital interface used in au OCR system.
Figure 2B:
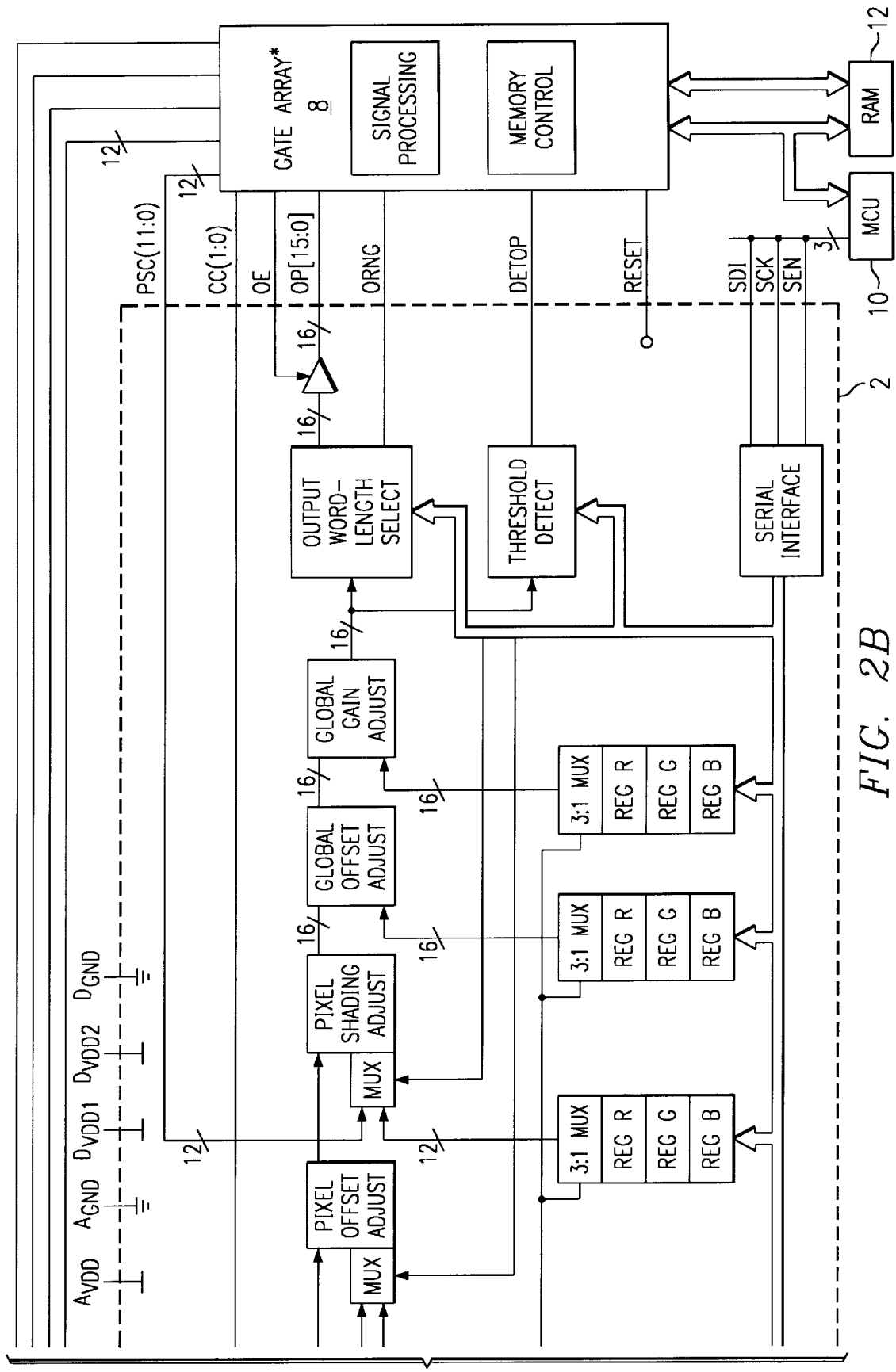

FIG. 2 is a system drawing illustrating the integrated analog to digital interface 2 utilized in an OCR system. A CCD image sensor 4 provides scanning input. As CCD devices typically operate in the 12–15 volt range, the output signal should be scaled down to an acceptable voltage level for interface 2. Accordingly, a signal conditioning block 6 brings the CCD output down to about a 5 volt input signal level. After processing by interface 2 occurs, a gate array 8 provides additional scaling of pixel and further processing for an end equipment (unillustrated) such as a printer or monitor. Typical end-equipment comprising a flat-bed scanner (PC peripheral). Transfer of an image to a printer or monitor is only secondary (i.e. after the image has been scanned into the PC). A main processing unit 10, such as a microcontroller, with memory 12, such as random access memory (RAM), and a clock generator 14 complete the system. Further discussion of selected parts of the OCR system are provided below with particular emphasis applied to interface 2.

CCD Image Sensor

CCD image sensor 4 is commercially available and manufactured by semiconductor manufacturers such as Texas Instruments Incorporated. While not shown in the system drawing of FIG. 1, such devices are linear arrays that are typically driven by inputs for shift gate, reset and a two phase clock. A charge proportional to the light input is generated by a photo diode for each pixel of the array. The charge for each pixel is transferred in parallel into the analog CCD shift register using the shift gate input and is then shifted out serially using a two phase clock. At its output (OS) pin, the CCD array converts the charge for each pixel into a voltage using a capacitor and source follower metal-oxide-semiconductor transistor, the charge on this capacitor is reset for each pixel by the reset pulse input. This results in a typical output waveform having a reset period, a dark period and a period containing video output for each pixel. Thus waveform sits on a varying d.c. offset of typically 5 volts and is negative going for an increase in video output. An output (DOS pin) is also provided from CCD arrays with contains only the d.c. level.

CCD Array Analog to Digital Interface Functions

In FIG. 2, signal conditioning block 6 provides interface from CCD sensor 4 to analog to digital interface 2. Before discussing conditioning block 6 in detail, to facilitate understanding, a general description of converting the CCD array's analog output into digital form is provided. The video output waveform has first to be removed from the varying dc. level on which it sits and shifted in level to be compatible with interface 2 which runs from a single 5 volt supply rail. Gain has to be applied to bring the signal up to the full scale range of interface 2 and a means provided to adjust static gain to compensate for variations between devices or multiple outputs of color arrays. Once these static d.c. levels (offsets) and gain levels have been adjusted, dynamic corrections are needed on a pixel by pixel basis.

Figure 3:
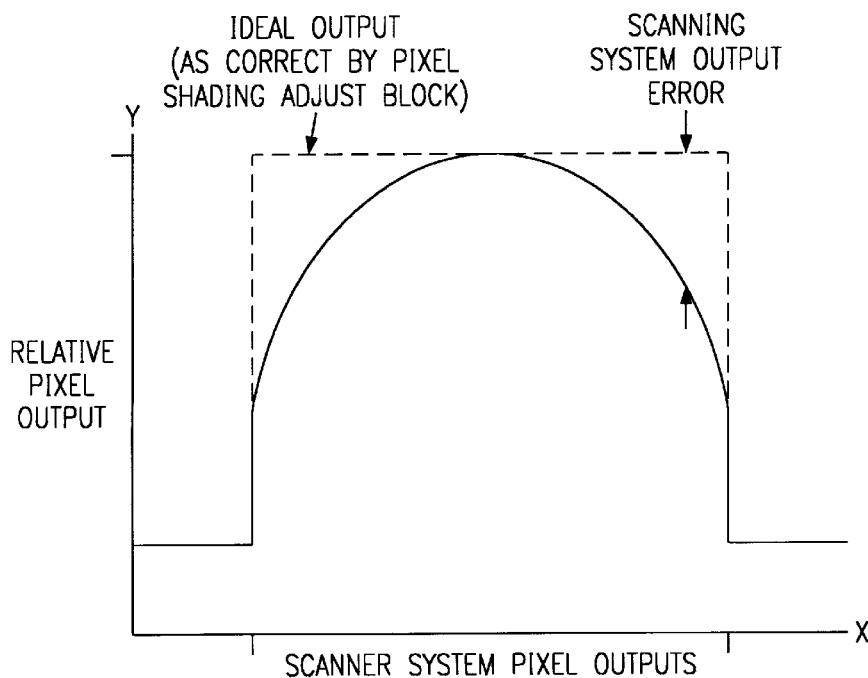
FIG. 3 illustrates relative pixel output on the Y axis vs. scanner system pixel outputs on the x axis.

Dynamic gain adjustment is needed to compensate for the fall off in output from the center to the ends of the array when used in scanner applications as shown in FIG. 3 which illustrates relative pixel output on the Y axis vs. scanner system pixel outputs on the x axis. The black line shows scanning system output while the dotted line shows an ideal output as corrected by pixel Dynamic offset adjustments are required to compensate for the pixel by pixel variation in black d.c. levels obtained from different CCD array elements. D.C. restoration may optionally be required. Global adjustments of gain and offset across a whole scan are respectively used to correct color balance and contrast and to change brightness.

Input D.C. Level Shift, Output Offset and Channel Gain

Returning to FIG. 2, the OCR system uses external op-amps, configured as differential amplifiers 6a–6c, to remove the d.c. level present in the CCD's outputs in signal conditioning block 6. This is achieved using the common mode voltages from the OS and SOS outputs for each channel. D.C. bias is provided for the external differential amplifier 6a–6c from interface 2's VDAC output as shown in FIG. 2. Without any residual offset from CCD 4, the differential amplifier's minimum output will be VDAC/2, unaffected by the external gain setting "G". Offset at the output of the external differential amplifiers including residual offset from CCD4 should be low enough to ensure that CCD 4's amplified signal is within the input common mode range of interface 2 and that the offset can be adjusted out by interface 2's internal DAC.

The external amplifiers 6a–6c also provide the system gain for each channel to ensure each channel's output amplitude is greater than half the ADC fill scale range. Variations between the red, blue and green (RGB) channels of CCD4 can have a 10 to 1 ratio in output. To minimize the offset at the amplifier output with the highest gain, the external amplifiers should be configured for gains in the range of ⅓ to 3 rather than 1 to 10 to compensate for this output variation. This is achieved by scaling the gain setting resistors GR over this ⅓ range.

ANALOG TO DIGITAL INTERFACE 2

Figure 4:
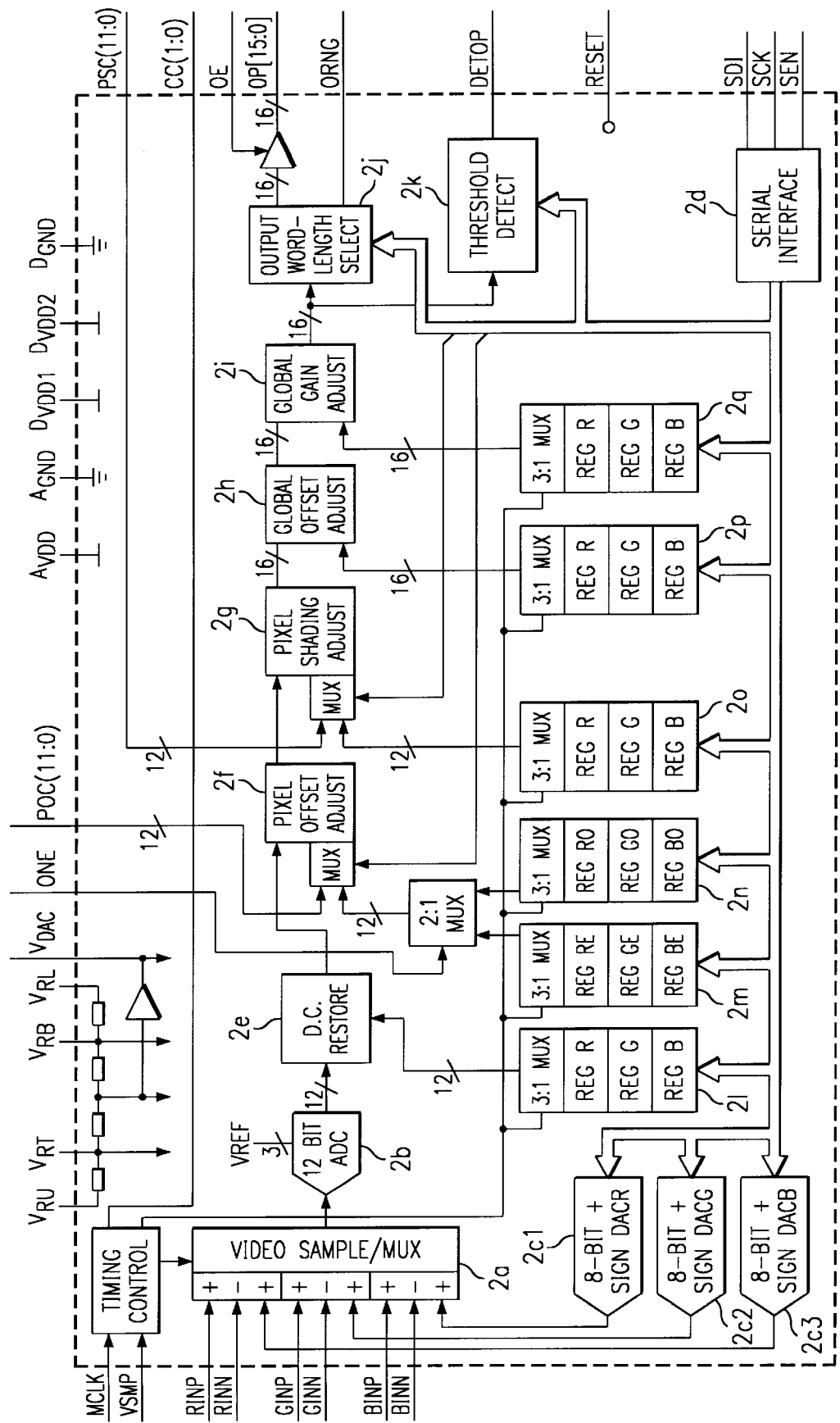
FIG. 4 is a block diagram illustrating the integrated analog to digital interface.

FIG. 4 is an enlarged block diagram of analog to digital interface 2 of FIG. 2. Discussion is now turned to the circuit block of analog to digital interface 2.

RGB Channel Multiplexer and Sampler

For color CCD image sensor arrays 4, a combined three input multiplexer and sampler 102a is employed enabling the use of a single fast 12-bit ADC 2b and DSP channel. Multiplexer/sampler 2a has three differential inputs for each of the RGB channel outputs and a further internal input for each channel used to compensate for residual offset in the input signal. This internal offset compensation is provided by three 8-bit plus sign DACs 2c1–2c3, which give bipolar offset correction with respect to the input reference levels. The three DACs 2c1–2c3 are updated via the serial interface 2d (later described).

The input structure may be set up for use in single ended or filly differential mode, under control of the serial interface 2d. The configuration shown in FIG. 2 is single ended, with the negative inputs tied to VDAC, which is the buffered midpoint of the ADC reference chain. Differential mode may be used when an amplifier with differential outputs is placed between CCD image sensor 4 and interface 2.

In color operation, the three channel sampling system 2a multiplexes the three channels to the input of ADC 2b in a sequence defined by the VSMP input synchronization pulse. In monochrome operation, the channel selection between R, G and B inputs is achieved via the serial interface 2d.

Analog to Digital Converter

ADC 2b is implemented using a 12-bit pipelined architecture which performs conversions at half the MCLK clock rate. ADC 2b has it's full scale range defined by the voltages applied to pins VRT and VRB, which should be set to 3.75 and 1.25 volts respectively to give a full scale range of 3.75–1.25=2.5 volts. Pins VRU and VRL are connected to extensions of the internal reference chain, which allow the 3.75 and 1.25 volt levels to be derived from a 5 volt reference applied between VRU and VRL. All reference pins should be capacitively decoupled externally.

The combination of the input multiplexer structure with the internal offset correction DACs allows a wide range of input voltages to accommodated. The relationship between input voltage levels (at the positive and negative inputs, Vinp/Vinn) and ADC full scale an zero scale results, is shown in the Table 1 and Table 2 of appendix 2 over a range of input offset voltages for both single ended and differential input modes. The tables also show the DAC correction voltage and code required in each case. These examples assume that the ADC reference pins VRT and VRB are set to 3.75 and 1.25 volts respectively. The signals shown in Table 1 and 2 of appendix 2 cover the full scale range of the ADC. In practice, a reduced range will be used to allow some headroom. In such cases, a wider range of input offset voltages can be accommodated.

Sampling Modes

Two input sampling modes are provided, normal and Correlated Double Sampling (CDS). Sampling mode selection is made via the serial interface 2d AU internal timing and sampling is performed relative to the rising edge of the MCLK clock input signal. MCLK is applied at twice the required ADC conversion rate. Synchronization of sampling and channel multiplexing to the incoming video signal is performed by the VSMP input synchronization pulse.

Normal Sampling Mode

Figure 5A:
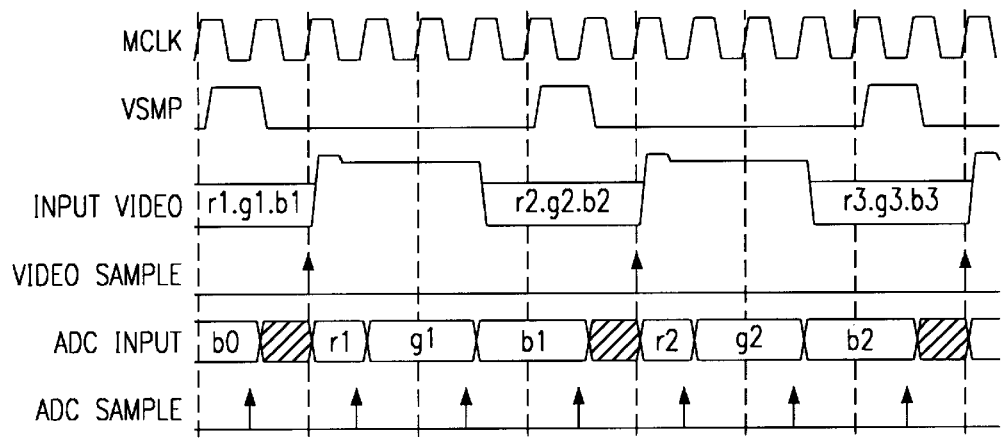
FIG. 5a is a timing diagram of signals in normal sampling mode for color operation.
Figure 5B:
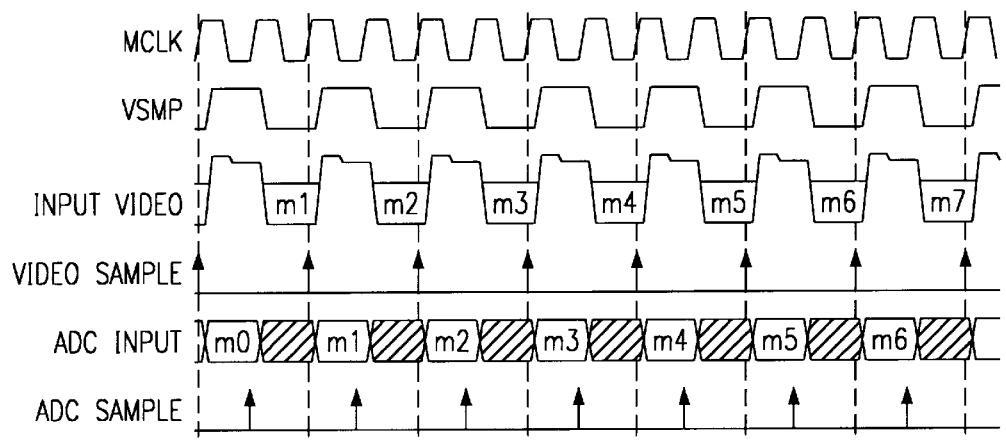
FIG. 5b is a timing diagram of signals in normal sampling mode for monochrome operation.

FIG. 5a. shows the timing of signals in normal sampling mode for color operation while FIG. 5b shows the timing of signals in normal sampling mode for monochrome operation. In color operation, all three input channels are sampled at the same instant on the first rising edge of MCLK alter the VSMP pulse. An internal timing circuit then controls the multiplexing of the three channels to the ADC 2d input in R,G,B sequence. In this mode, VSMP is applied at the input pixel rate, and ADC conversions are performed at three times the input pixel rate. For monochrome (single channel) operation VSMP is again applied at the input pixel rate, however in this case ADC 2b is supplied with a continuous stream of samples from a single input channel. Input channel selection in this mode is achieved via serial interface 2d. In both cases, a simple external delay circuit can be used to align the video data with the sampling instant, provided that the CCD4 clocks are generated from MCLK.

Correlated Double Sampling Mode

Figure 5C:
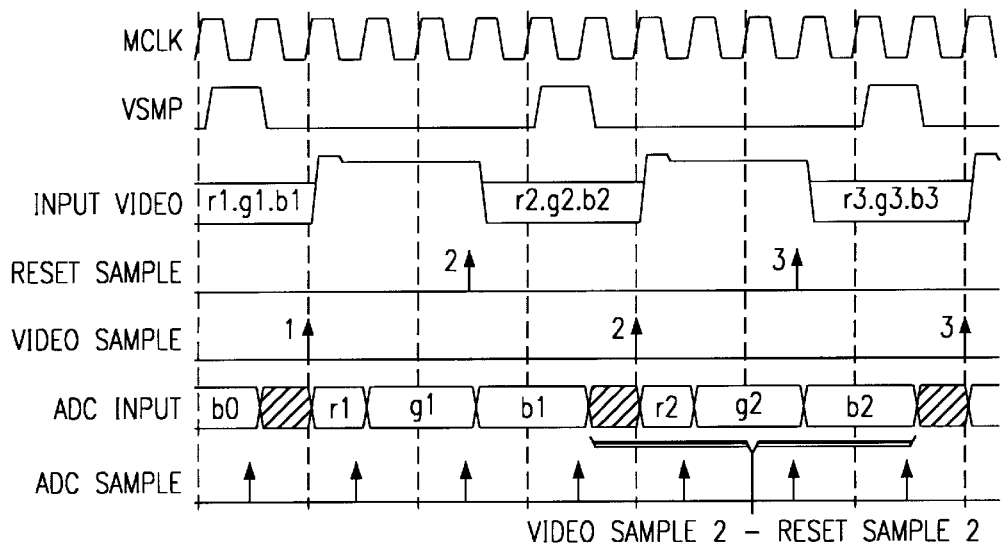
FIG. 5c is a timing diagram of signals in correlated double sampling mode.

In CDS mode two samples are taken per channel within each pixel period. FIG. 5c. shows timing diagram for this mode of operation. The video signal is sampled both during the reset phase and during the video information with timing defined relative to the VSMP input. The difference between these two samples forms the input to ADC 2b. The multiplexing shown in FIG. 5c refers to color operation, however the same overall timing scheme applies to monochrome CDS operation, in that a single input sample is applied to ADC 2b per VSMP period. Thus the maximum sampling rate in monochrome CDS mode is limited to a third of the maximum rate achievable in normal monochrome sampling mode.

Digital Signal Processing Sections

The block diagram of FIG. 4 shows the image processing functions following the ADC 2b as follows:

DC restore 2e: This allows fine adjustment of the D.C. video level at the ADC 2b output, with adjustment values being programmed via the serial interface 2d.

Pixel by pixel offset compensation 2f: This uses offset coefficients that are either externally supplied at the multiplex channel rate or supplied from internal default registers whose value is programmed via the serial interface 2d.

Compensation for pixel by pixel shading curve non-uniformity and photo response non-uniformity within the sensor 2g: Coefficients externally supplied at the multiplexed channel rate. Default registers are provided for use during calibration.

Global Offset adjust 2h: Offset adjust over the whole scan for each channel to give brightness control. Values programmed via the serial interface 2d.

Global Gain adjust 2i: Independent gain adjust over the whole scan for each channel giving contrast and color balance control. Gain values programmed via the serial interface 2d.

Programmable output wordlength selection 2j. The output wordlength can be programmed to 8, 10, 12 or 16 bits via the serial interface 2d.

Programmable threshold detector with independent thresholds for each channel 2k.

Global adjustments are implemented after the pixel by pixel compensations to allow the former to be adjusted and modified in operational use without having to re-calibrate the pixel-by-pixel factors. A discussion of the above blocks is now provided DC Restore 2e DC Restore block 2e is used for fine adjustment of the DC signal level at the ADC 2b output, by adding a value stored in internal registers 21. Separate level adjust registers are provided for each channel (color), with multiplexing between channels controlled internally. The level adjust registers 21 are programmed via the serial interface 2d as 12 bit 2's compliment numbers, with a range of +/- 0.5 of the ADC fill scale, allowing 1 bit resolution in adjustment of the ADC 2b output. The DC adjustment registers are reset to zero.

Pixel Offset Compensation 2f

The output of the DC restore circuit 2e is passed to an adder 2f which performs pixel by pixel offset compensation. Compensation values can either be supplied externally, at the multiplexed pixel rate, allowing different correction values for each pixel in the array, or supplied from internal default values programmed via the serial interface 2d. Selection between the two sources is controlled via the serial interface 2d. Two sets of internal default registers 2m and 2n are provided to allow correction values to be stored internally for use on even and odd pixels, with selection between the two sets under control of the ONE pin. (ONE=0 for even registers, ONE=1 for odd registers). This feature allows correction of differing DC offsets output on even and odd pixels, which occur in some CCD4 sensors, using internally stored data.

Pixel offset correction values are input or stored as 12 bit 2's compliment numbers. Programmable internal scaling is provided which allows the offset correction factors to cover +/-0.5, +/- 0.25, +/- 0.125 or +/-0.0625 of the ADC full scale range. The internal pixel correction registers are reset to zero.

Pixel Shading Compensation 2g

This stage is implemented as a digital multiplier which corrects for non-uniform shading using externally supplied 12-bit unsigned values. The external correction factors are supplied at the multiplexed pixel rate. The external correction range is from 0 to 4, which allows shading non-uniformity of up to 75%, (i.e. the minimum input signal is 25% of the peak), to be corrected without loss of resolution in the high gain pixels at the center of the scan. Internal default registers 2o are provided to set the gain through this block during calibration. The internal registers default to a value of 1 on reset.

Global Offset Adjust 2h

Global offset adjust is provided by an adder 2h using three independent bipolar offset coefficients setup via the serial interface 2d. A range of +4 times the ADC full scale range is provided. This range allows the output signal to be shifted across the entire range of the 16 bit output bus. The global offset coefficients are programmed as into register 2p as 16 bit 2's Compliment numbers, which default to zero on reset.

Global Gain Adjust 2i

Global gain adjust is provided by a multiplier using gain values setup via the serial interface 2d. Three independent 16-bit gain values with a range of 0 to 2 are stored (one for each channel) in registers 2q. The default value of the global gain coefficients is 1.

Threshold Detector 2k

The threshold detector 2k operates on the output signal from the global gain adjust stage 2i, comparing the signal to individual threshold levels for each color channel, which are programmed via the serial interface 2d. If the signal exceeds the threshold, the DETOP pin is forced high. Two basic modes of operation can be programmed, either multiplexing between the three channels in sequence with the internal data, or operating continuously on one of the three channels. The input signals to the threshold detector are represented as 16 bit bipolar 2's compliment numbers. Threshold values should be programmed as 15 bit unipolar numbers in the range 0 to 32767.

Output Wordlength Select 2j

This block is used to define the output wordlength, which can be programmed to 8, 10, 12 or 16 bits via the serial interface 2d. An internal clip function is provided that can be used in unipolar or bipolar fashion. For example: if 8 bit output wordlength is selected, the output data on OLI OP(15:0) will be limited to the range 0 to 255 for unipolar clipping or −128 to 127 for bipolar clipping. If the input signal to this block exceeds the positive clip level, the ORNG signal is forced high. In 8, 10 and 12 bit output modes, output data bit OP(15) functions as an under-range flag, i.e. it will be driven high if the input signal is less than the negative clip level. OP(15) also functions as an under-range signal in 16 bit unipolar clipping mode.

Serial Interface 2d

Figure 6:
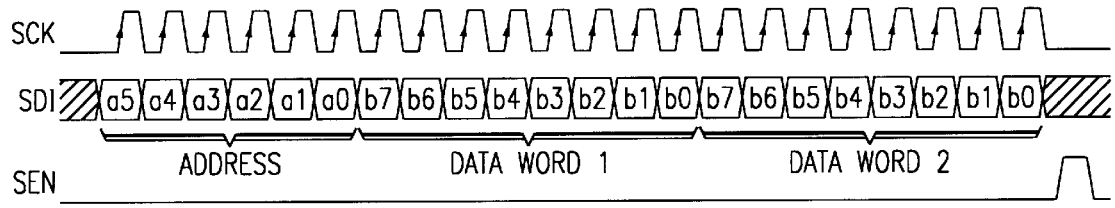
FIG. 6 is a timing diagram of a serial write operation.

The serial interface 2d is used to configure the device operation and to program internal data registers 2l–2q. FIG. 6 is a timing diagram of a serial write operation. A serial data stream applied to pin SDI is clocked into the device on the rising edge of SCK. The data stream comprises 6 address bits and two 8 bit data words. Once this data has been shifted into the serial interface 2d, a pulse is applied to SEN to transfer the data to the appropriate internal register 2l–2q.

Appendix 3 and appendix 4 define the internal register map for the device and control hit functionality, respectively. The first 4 addresses in the tables (address bit a5=0) are used to program set-up registers and to provide a software reset feature. The remaining 8 entries in the table define the address locations of the internal data registers 2l–2q. In each case, a further three sub-addresses are defined for the red, green or blue register of the internal data register. Selection between the red, green and blue registers is performed by address bits a1 and a0, as defined in the tables. Setting both a1 and a0 equal to 1 forces all three registers to be updated to the same data value, as specified in data words 1 and 2. Blank entries in appendix 3 can be taken as "don't care" values.

Figure 8A:
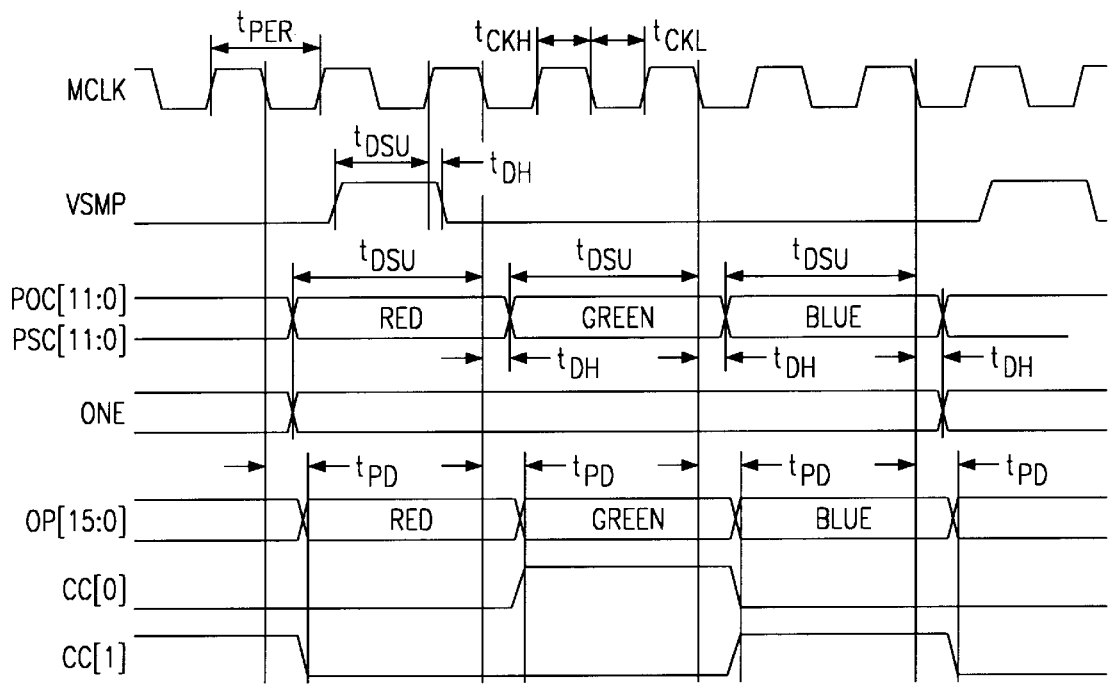
FIG. 8a is a digital timing diagram for color mode.
Figure 8B:
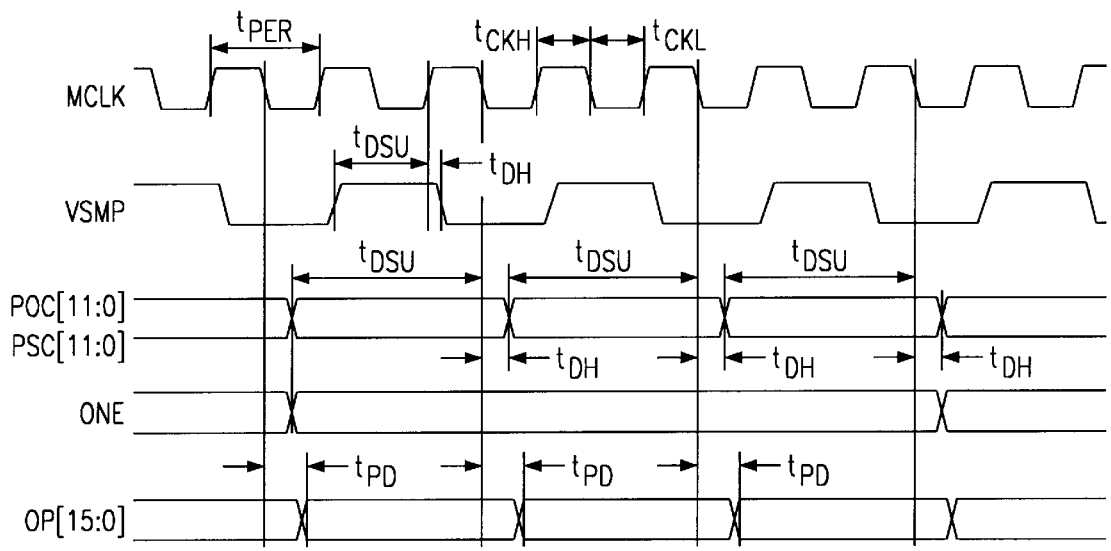
FIG. 8b is a digital timing diagram for monochrome mode.
Figure 7A:
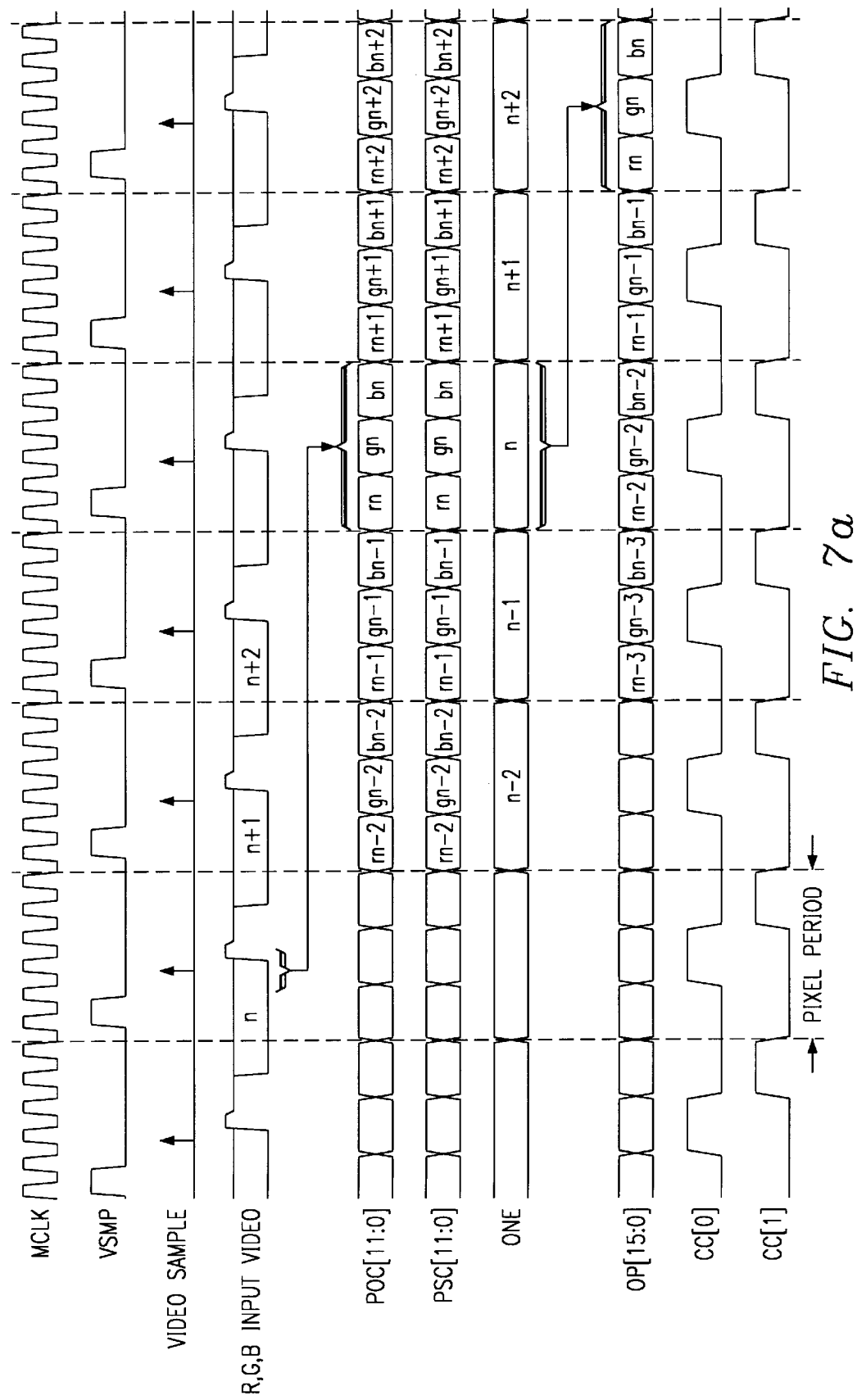
FIG. 7a is an overall system timing diagram for color mode.
Figure 7B:
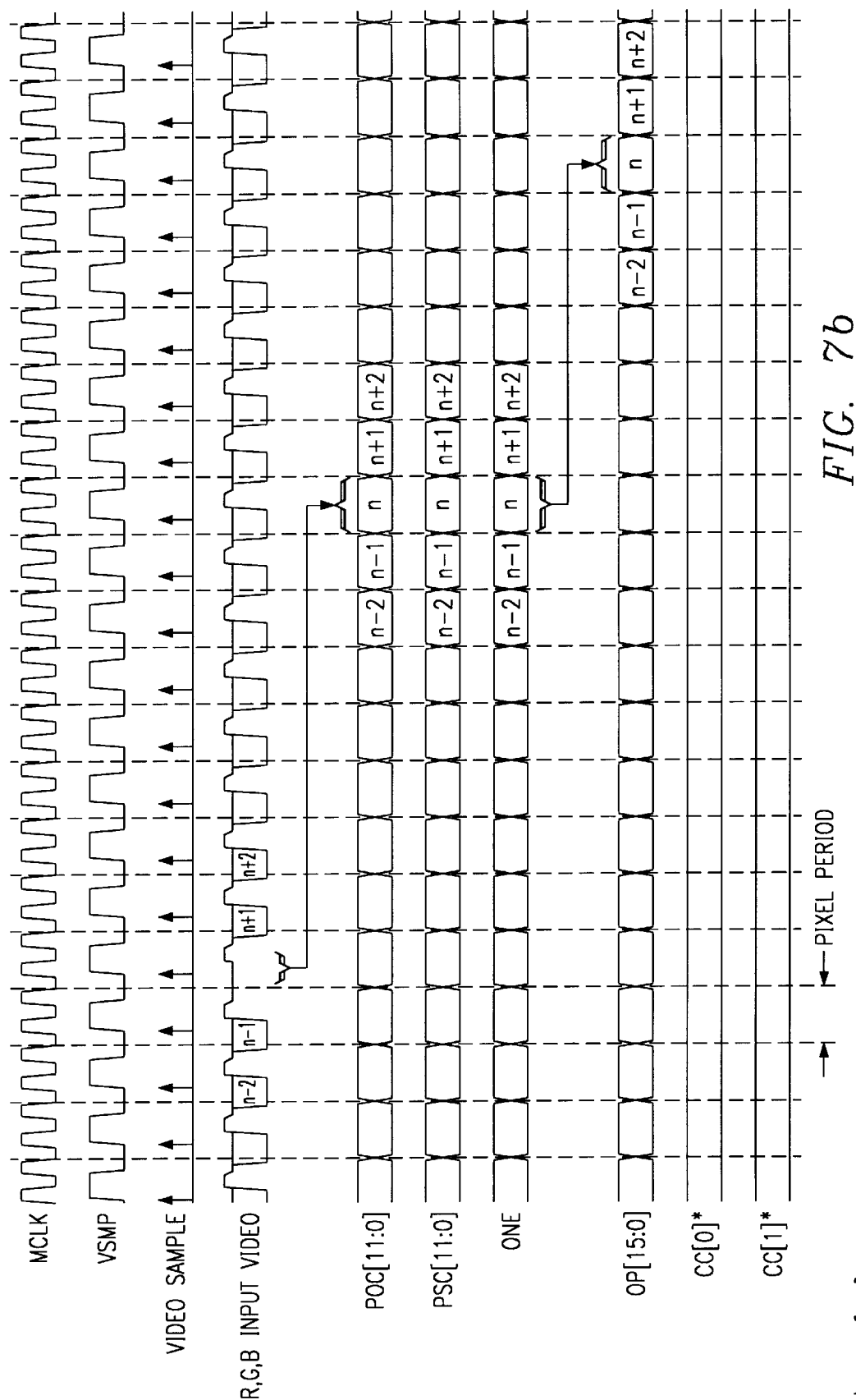
FIG. 7b is an overall system timing diagram for monochrome mode.
Figure 9A:
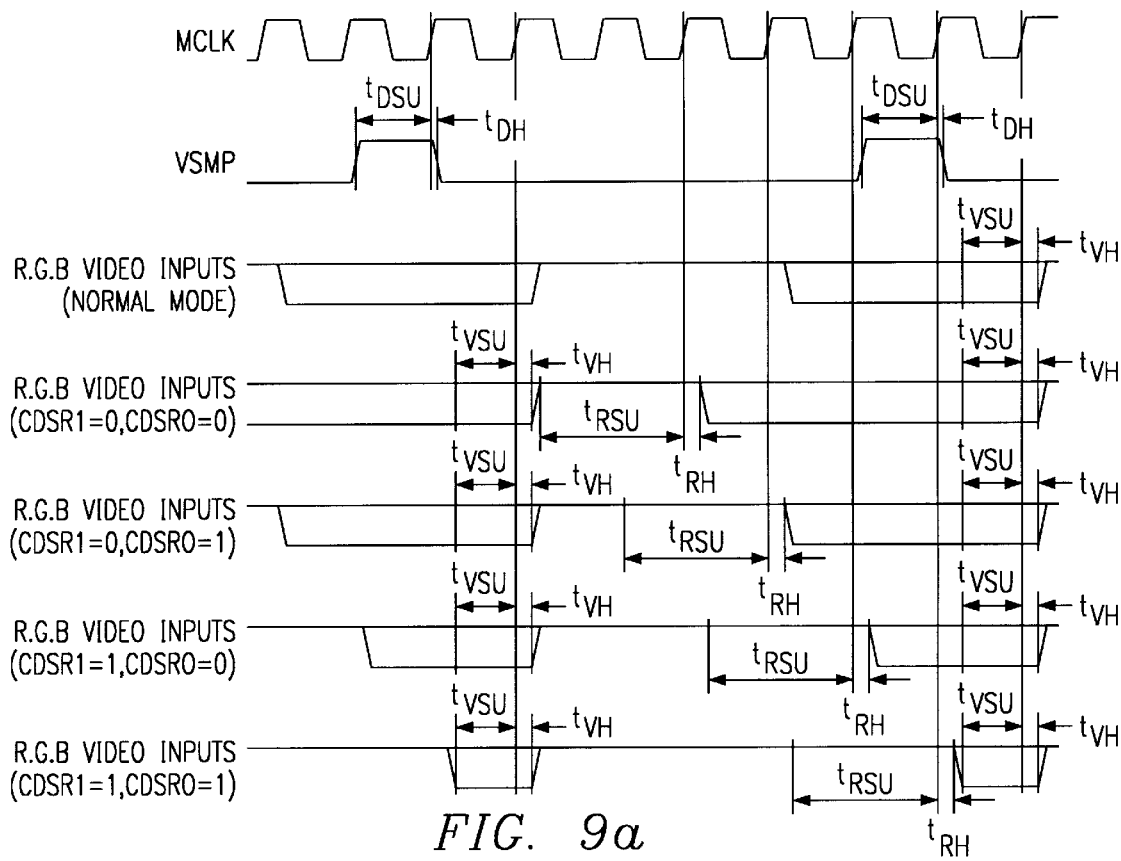
FIG. 9a is a timing diagram for video input in color mode.
Figure 9B:
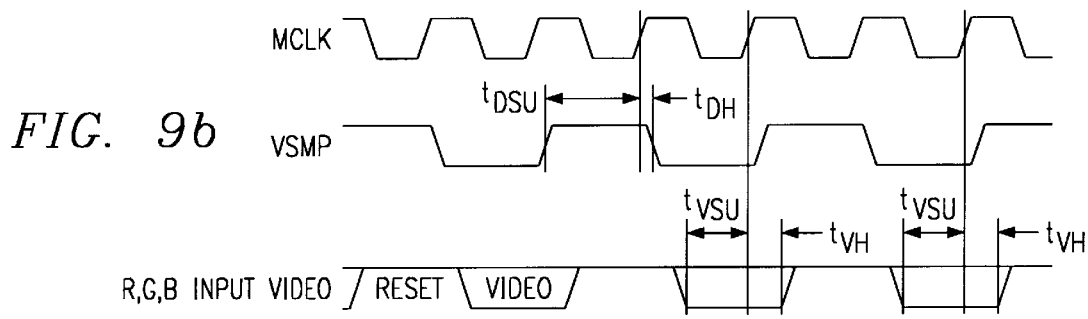
FIG. 9b is a timing diagram for video input in monochrome mode.
Figure 10:
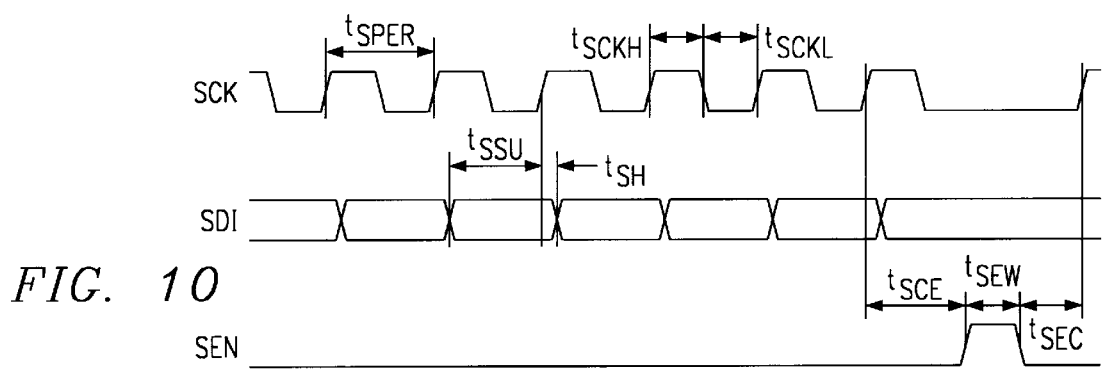
FIG. 10 is a timing diagram for the serial interface.

FIGS. 7a and 7b present overall system timing diagrams in the color mode and monochrome mode of operation while FIGS. 8a and 8b present detailed digital timing diagrams for color mode and monochrome mode. FIGS. 9a and 9b present detailed video input timing diagrams in the color mode and monochrome mode of operation. FIG. 10 illustrates a detailed digital timing diagram of the serial interface 2d.

The analog to digital interface subsystem 2 provides a simpler, more robust and more reliable method of operation due to the lack of sensitive analog processing. Instead, a single, first ADC 2b is used and all processing occurs in the digital domain. No attempt is made to perform scaling or offset correction on individual pixels in the analog domain. No variable gain amplifiers are used and the reference levels of the ADC 2b are not modified.

The integrated interface 2 includes 3 DAC's 2c1–2c3 that are used to do a rough offset cancellation on the three analog input signals (RGB) in the analog domain. A triple sample/ hold circuit 2a samples the RGB signals simultaneously, multiplexes the data and passes the three signals on the ADC 2b sequentially (at about 3 times the data rate). The sample/ hold circuit 2a has the capability to operate in fully differential as well as single ended input mode, and can perform correlated double sampling if needed A high resolution ADC 2b converts the 3 multiplexed signals from sample/hold circuit 2a. A first digital offset correction circuit 2f restores the level of the RGB signals in the digital domain on a pixel by pixel basis. A first digital gain correction circuit 2g compensates for sensitivity variations of the RGB sensors in the digital domain on a pixel by pixel basis. A second digital offset correction circuit 2h restores the overall DC level of the RGB signals in the digital domain. A second digital gain correction circuit 2i compensates for overall sensitivity variations of the RGB sensors in the digital domain. A serial interface 2d is used to load the overall gain and offlet coefficients.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

APPENDIX 1

| Pin No. | Name | Type | Description |
| --- | --- | --- | --- |
| 52 | RINP | Analogue IP | Positive Red Channel input video |
| 51 | RINN | Analogue IP | Negative Red Channel input video |
| 48 | GINP | Analogue IP | Positive Green Channel input video |
| 47 | GINN | Analogue IP | Negative Green Channel input video |

APPENDIX 1-continued

| Pin No. | Name | Type | Description |
|---|---|---|---|
| 46 | BINP | Analogue IP | Positive Blue Channel input video |
| 45 | BINN | Analogue IP | Negative Blue Channel input video |
| 55 | MCLK | Digital IP | Master clock. This clock is applied at either six times or twice the input pixel rate for colour and monochrome operation respectively. MCLK is divided by two internally to define the ADC sample rate, and to provide the clock source for the DSP section |
| 54 | VSMP | Digital IP | Video sample synchronisation pulse. This signal is applied synchronously with MCLK to specify the point in time that the input is sampled. The timing of internal multiplexing between the R, G and B channels is derived from this signal |
| 42, 40, 41, 43 | VRU, VRT, VRB, VRL | Analogue IP | ADC reference voltages. The ADC reference range is applied between VRT (full scale) and VRB (zero level). VRU and VRL can be used to derive optimum reference voltages from an external 5V reference |
| 44 | VDAC | Analogue OP | Buffered mid-point of ADC reference string. Used internally to set DAC reference voltages |
| 27–38 | POC(11:0) | Digital IPs | Pixel Offset Coefficient Input. This 12 bit word is applied at the multiplexed pixel rate (ie three samples per pixel period in colour mode) to correct offset errors in a pixel by pixel fashion. |
| 15–26 | PSC(11:0) | Digital IPs | Pixel Shading Coefficient Input. This 12 bit quantity is applied at the multiplexed pixel rate (ie three samples per pixel period in colour mode) to correct shading effects in a pixel by pixel fashion. |
| 59 | ONE | Digital IP | Odd not Even. This signal is used to define even and odd pixels when the internal pixel offset correction registers are in use. (Even = 0, Odd = 1) |
| 61–68, 2–9 | OP(15:0) | Digital OPs | Tri-state digital 16-bit output. In 8, 10 and 12 bit output modes, OP(15) is used to indicate that the output pixel is negative, ie OP(15) can be used as an under-range indicator. OP(15) is active high when indicating under-range. |
| 10, 11 | CC(1:0) | Digial OP's | Colour code outputs. These outputs indicate which channel the current output sample was taken from. (R = 00, G = 01, B = 10) |
| 12 | ORNG | Digital OP | Over-range signal, active high. In 8, 10 and 12 bit output modes, this signal indicates that the current output pixel has exceeded the maximum achievable for the output word length in use. |
| 13 | DETOP | Digital OP | Threshold detector output, active high. This signal indicates that the current output pixel has exceeded the internally programmed threshold for that channel |
| 39 | RESET | Digital IP | Reset Input, active high. This signal forces a reset of all internal registers in the device |
| 53 | OE | Digital IP | Output tri-state control, outputs enabled when OE = 0 |
| 58 | SDI | Digital IP | Serial Data In. Serial interface input data signal. |
| 57 | SCK | Digital IP | Serial Clock. Serial interface clock signal. |
| 56 | SEN | Digital IP | Serial Enable. |
| 60.1 | DVDD1.2 | Digital Supply | Positive Digital Supply (5V) |
| 14 | DGND | Digital supply | Digital ground (0V) |
| 50 | AVDD | Analogue | Positive Analogue supply (5V) |

APPENDIX 2

Table 1. Single Ended mode input voltage ranges

| | Full Scale Input | | Zero Scale Input | | DAC | DAC Code |
|---|---|---|---|---|---|---|
| | Vinp | Vinn | Vinp | Vinn | Voltage | (Hex) |

Input Offset Voltage

| | | | | | | |
|---|---|---|---|---|---|---|
| 0.625 | 4.375 | 2.5 | 1.875 | 2.5 | −0.625 | 17F |
| 0 | 3.75 | 2.5 | 1.25 | 2.5 | 0 | 000 |
| −0.625 | 3.125 | 2.5 | 0.625 | 2.5 | 0.625 | 07F |

APPENDIX 2-continued

Table 2. Differential mode input voltage ranges

| | Full Scale Input | | Zero Scale Input | | DAC | DAC Code |
|---|---|---|---|---|---|---|
| | Vinp | Vinn | Vinp | Vinn | Voltage | (Hex) |

Differential Input Offset Voltage

| | | | | | | |
|---|---|---|---|---|---|---|
| 1.25 | 4.375 | 0.625 | 1.875 | 3.125 | −1.25 | 17F |
| 0 | 3.75 | 1.25 | 1.25 | 3.75 | 0 | 000 |
| −1.25 | 3.125 | 1.875 | 0.625 | 4.375 | 1.25 | 07F |

APPENDIX 3

Serial Interface Register Map.

| Address | | Data | B | | | | | | | |
|---|---|---|---|---|---|---|---|---|---|---|
| <a5...a0> | Description | Word | b7 | b6 | b5 | b4 | b3 | B2 | b1 | b0 |
| 000000 | Setup Register 1 | 1 | | | | | | | | INVADC |
| | | 2 | ADCEN | BICLIP | ADCMX | MONO | DEFPG | DEFPO | DNS | CDS |
| 000001 | Setup Register 2 | 1 | | | | | | | CDSREF1 | CDSREF0 |
| | | 2 | POSCL1 | POSCL0 | WLSEL1 | WLSEL0 | THSEL1 | THSEL0 | CHAN1 | CHAN0 |
| 000010 | Reserved | 1 | | | | | | | | |
| | | 2 | | | | | | | | |
| 000011 | Software Reset | 1 | | | | | | | | |
| | | 2 | | | | | | | | |
| 1000xx | DAC Values | 1 | | | | | | | | POL |
| | | 2 | D7 | D6 | D5 | D4 | D3 | D2 | D1 | D0(LSB) |
| 1001xx | DC Restore Values | 1 | | | | | D11(MSB) | D10 | D9 | D8 |
| | | 2 | D7 | D6 | D5 | D4 | D3 | D2 | D1 | D0(LSB) |
| 1010xx | Default Even Pixel | 1 | | | | | D11(MSB) | D10 | D9 | D8 |
| | Offsets | 2 | D7 | D6 | D5 | D4 | D3 | D2 | D1 | D0(LSB) |
| 1011xx | Default Odd Pixel | 1 | | | | | D11(MSB) | D10 | D9 | D8 |
| | Offsets | 2 | D7 | D6 | D5 | D4 | D3 | D2 | D1 | D0(LSB) |
| 1100xx | Defauilt Pixel Gains | 1 | | | | | D11(MSB) | D10 | D9 | D8 |
| | | 2 | D7 | D6 | D5 | D4 | D3 | D2 | D1 | D0(LSB) |
| 1101xx | Global Offsets | 1 | D15(MSB) | D14 | D13 | D12 | D11 | D10 | D9 | D8 |
| | | 2 | D7 | D6 | D5 | D4 | D3 | D2 | D1 | D0(LSB) |
| 1110xx | Global Gains | 1 | D15(MSB) | D14 | D13 | D12 | D11 | D10 | D9 | D8 |
| | | 2 | D7 | D6 | D5 | D4 | D3 | D2 | D1 | D0(LSB) |
| 1111xx | Threshold Values | 1 | | D14(MSB) | D13 | D12 | D11 | D10 | D9 | D8 |
| | | 2 | D7 | D6 | D5 | D4 | D3 | D2 | D1 | D0(LSB) |

| xx | Address LSB decode | a1 | a0 |
|---|---|---|---|
| | Red Register | 0 | 0 |
| | Green Register | 0 | 1 |
| | Blue Register | 1 | 0 |
| | Red, Green and Blue | 1 | 1 |

APPENDIX 4

Control bit descriptions

| Register | Bit(s) | Default | Description |
|---|---|---|---|
| Setup Register 1 | BICUP | 0 | Bipolar Clip Enable: 0 = unipolar clip, 1 = bpolar clip. |
| | ADCMX | 0 | ADC Mux Control: 0 = normal operation, 1 = ADC output multiplexed to OP |
| | MONO | 0 | Mono/Colour select: 0 = colour, 1 = monochrome operation |
| | DEFPG | 0 | Select Default Pixel Gain: 0 = external pixel gain, 1 = default (internal) |
| | DEFPO | 0 | Select Default Pixel Offsets: 0 = external pixel offset. 1 = default (internal) |
| | DNS | 0 | Select differential/single encoded mode: 0 = single ended. 1 = differential |
| | CDS | 0 | Select Correlated double sampling mode: 0 = normal sampling, 1 = CDS mode |
| | ENADC | 1 | ADC Standby control: 0 = standby, 1 = active. |
| | INVADC | 0 | ADC output poplarity: 0 = non inverting, 1 = inverted. |
| Setup Register 2 | POSCL1-0 | 00 | Pixel Offset scaling<br>00 = +/− 0.5 FS<br>01 = +/− 0.25 FS<br>10 = +/− 0.125 FS<br>11 = +/− 0.0625 FS |
| | WLSEL1-0 | 10 | Output Wordlength Select<br>00 = 8 bits (OP(7:0) contains output word)<br>01 = 10 bits (OP(9:0) contaings output word)<br>10 = 12 bits (OP(11:0) contains output word)<br>11 = 16 bits (OP(15:0) contains output word) |
| | THSEL1-0 | 11 | Threshold Detector Operating Mode<br>00 = Operate on Red channel only<br>01 = Operate on Green channel only<br>10 = Operate on Blue channel only<br>11 = Three Channel |
| | CHAN1-0 | 00 | Monochrome mode channel select<br>00 = Red Channel<br>01 = Green Channel<br>10 = Blue Channel<br>11 = Not Used |
| | CDSREF1-0 | 01 | CDS Mode Reset Timing Adjust<br>00 = Advance 1 MCLK period<br>01 = Normal |

APPENDIX 4-continued

Control bit descriptions

| Register | Bit(s) | Default | Description |
|---|---|---|---|
| | | | 10 = Retard 1 MCLK Period |
| | | | 11 = Retard 2 MCLK Periods |

What is claimed is:

1. An analog to digital video interface, comprising:

a video sample circuit that simultaneously samples a red, a green and a blue analog input signal at a sample rate and contains a multiplexer circuit selectable to allow the output of one of the analog input signals to be selected;

an analog to digital converter connected to the video sample circuit having a conversion rate about 3 times the sample rate of the video sample circuit to generate a digital pixel representation of the red, green and blue analog input signals;

a pixel offset adjust circuit connected to the analog to digital converter for performing the digital addition of positive or negative offset values to the individual pixel values, whereby the offset values are updated at the pixel rate; and a pixel shading adjust circuit connected to the pixel offset adjust circuit for performing digital multiplication of the individual pixel values using shading coefficients updated at the pixel rate.

2. The analog to digital video interface of claim 1, further comprising:

a global offset adjust circuit connected to the pixel shading adjust circuit for performing the digital addition or positive or negative offset values to the individual pixel rate, whereby the offset values are updated at less than the pixel rate.

3. The analog to digital video interface of claim 2, further comprising:

a global gain adjust circuit connected to the global offset adjust circuit for performing the digital multiplication of the individual pixel values with gain coefficients, whereby the gain coefficients are updated at less than the pixel rate.

4. The analog to digital video interface of clam 3, further comprising:

an interface connected to the pixel offset adjust circuit, the pixel shading adjust circuit, the global offset adjust circuit and the global gain adjust circuit for allowing offset, shading or gain coefficients to be entered independently from the pixel generation process.

5. An analog to digital video interface comprising:

a video sample circuit that simultaneously samples a red, a green and a blue analog input signal at a sample rate and contains a multiplexer circuit selectable to allow the output of one of the analog input signals to be selected; and an analog to digital converter connected to the video sample circuit having a conversion rate about 3 times the sample rate of the video sample circuit to generate a digital pixel representation of the red, green and blue analog input signals; and circuitry to perform a correlated double sampling operation on each one of the red, green and blue analog input signals before they are converted by the analog to digital converter.

* * * * *